(12) United States Patent
Masamura

(10) Patent No.: US 8,087,641 B2
(45) Date of Patent: Jan. 3, 2012

(54) FLUID CONTROL VALVE WITH A HOLDING MEMBER TO PREVENT LOOSENING OF THREADED ENGAGEMENT

(75) Inventor: Akinori Masamura, Komaki (JP)

(73) Assignee: CKD Corporation, Komaki-shi (JP)

( * ) Notice: Subject to any disclaimer, the term of this patent is extended or adjusted under 35 U.S.C. 154(b) by 848 days.

(21) Appl. No.: 12/216,496

(22) Filed: Jul. 7, 2008

(65) Prior Publication Data
US 2009/0020722 A1    Jan. 22, 2009

(30) Foreign Application Priority Data
Jul. 20, 2007 (JP) ................................. 2007-189895

(51) Int. Cl.
*F16K 27/02* (2006.01)
(52) U.S. Cl. ...................... 251/331; 251/335.2; 251/367
(58) Field of Classification Search .................. 251/331, 251/335.2, 77, 79–81, 366–367
See application file for complete search history.

(56) References Cited

U.S. PATENT DOCUMENTS

| | | | | |
|---|---|---|---|---|
| 2,630,782 A | * | 3/1953 | Hodsdon | 119/14.07 |
| 2,681,752 A | * | 6/1954 | Jarrett et al. | 222/402.13 |
| 3,398,764 A | * | 8/1968 | Herion | 137/614 |
| 4,840,347 A | * | 6/1989 | Ariizumi et al. | 251/63.4 |
| 4,995,589 A | * | 2/1991 | Adishian et al. | 251/335.3 |
| 5,524,864 A | * | 6/1996 | Dubach | 251/267 |
| 6,612,538 B2 | * | 9/2003 | Fukano et al. | 251/63.5 |

FOREIGN PATENT DOCUMENTS

| | | |
|---|---|---|
| CN | 2723778 Y | 9/2005 |
| JP | A-2002-22055 | 1/2002 |
| JP | A-2007-46725 | 2/2007 |

OTHER PUBLICATIONS

Chinese Office Action issued on Feb. 12, 2010 in corresponding Chinese Patent Application No. 200810128152.4 (with translation).

* cited by examiner

*Primary Examiner* — John Bastianelli
(74) *Attorney, Agent, or Firm* — Oliff & Berridge, PLC

(57) ABSTRACT

For providing a fluid control valve capable of preventing looseness of a screw part between a valve main body and a valve upper body, the fluid control valve comprises a resin valve main body wherein a valve seat comes into or out of contact with a diaphragm, and a resin valve upper body engaged with the valve main body. The fluid control valve comprises a holding member to keep the valve main body and the valve upper body threadedly screwed together.

4 Claims, 16 Drawing Sheets

FLUID CONTROL VALVE WITH A HOLDING MEMBER TO PREVENT LOOSENING OF THREADED ENGAGEMENT

CROSS-REFERENCE TO RELATED APPLICATIONS

This application is based upon and claims the benefit of priority from the prior Japanese Patent Application No. 2007-189895 filed on Jul. 20, 2007, the entire contents of which are incorporated herein by reference.

BACKGROUND OF THE INVENTION

1. Field of the Invention

The present invention relates to a fluid control valve for controlling fluid.

2. Description of Related Art

For example, wafer processing such as etching and thin film growth is made in a semiconductor manufacturing process. If foreign matters such as particle adheres to a wafer during the wafer processing, such foreign matters cause various problems; undesired impurities disperse on the wafer, pattern defect is caused by the foreign matters confined between the thin films, or expected electric characteristics can not be obtained due to the undesired impurities dispersing on silicon and insulated film. For preventing these problems, a cleaning process to remove foreign matters from the wafer without deteriorating is employed before the wafer processing.

In the cleaning process, foreign matters are dissolved and removed by means of chemical methods using chemical liquid such as a mixture of sulfuric acid and hydrogen peroxide, a mixture of ammonia and hydrogen peroxide, or a mixture of hydrochloric acid and hydrogen peroxide. A fluid control valve is adopted to supply such chemical liquid to the wafer. Hydrogen peroxide having a high effect of oxidizing is employed as chemical liquid. In recent years, the chemical liquid is supplied to the wafer at high temperature so as to supply the chemical liquid in an activated state to the wafer. As a result, a fluid control valve tends to be exposed to high corrosion atmosphere in many cases.

If a fluid control valve, which is exteriorly configured with a valve main body and a cylinder fixed by metal screws, is used in high corrosion atmosphere as above mentioned, the metal screws could be corroded failing to provide initial fastening strength. Therefore, a fluid control valve 1100 of Japanese Unexamined Patent Application No. 2002-022055A (shown in FIG. 16) for example is arranged without using metal screws.

FIG. 16 is a sectional view of the fluid control valve 1100 of JP2002-022055A.

The fluid control valve 1100 is designed metal-free and all the components except a compression spring 1101 are made of resin or rubber. The fluid control valve 1100 is exteriorly configured with a resin-made valve upper body (hereinafter, "upper body") 1103 screwed up to a valve main body (hereinafter, "main body") 1102. In the upper body 1103, cylinder 1104 and cover 1105 are screwed up together structuring piston chamber 1106. In the piston chamber 1106, piston 1107 is mounted to be movable. Piston rod 1108 of the piston 1107 protrudes downward through the cylinder 1104 into the main body 1102 and is connected with a diaphragm 1109. The piston 1107 is movable upward and downward to keep balance between an elastic force of the compression spring 1101 and pressure of operation fluid supplied from an operation port 1110. This up and down movement makes the diaphragm 1109 move into or out of contact with a valve seat 1111 provided in the main body 1102.

SUMMARY OF THE INVENTION

However, in the fluid control valve 1100 of JP2002-022055A, the main body 1102 and the upper body 1103 are made of resin generating less friction resistance on a screw part 1112 between the main body 1102 and the upper body 1103. Due to such less friction resistance, the upper body 1103 easily turns around against the main body 1102. Consequently, for example, there is a possibility that an operator inadvertently moves the upper body 1103 around against the main body 1102 causing the screw part 1112 loosened. Further, as another possibility, when the fluid control valve 1100 is used for chemical liquid at high temperature, the screw part 1112 could be loosened due to thermal expansion of the main body 1102, the upper body 1103 and others.

When the screw part 1112 is loosened, strength to hold the diaphragm 1109 between the main body 1102 and the upper body 1103 becomes weaker, and as a result, a valve function is decreased. Further, the compression spring 1101 is designed to have an elastic force enough to enable valve closing. Therefore, if the screw part 1112 is loosened and the fastening strength becomes weaker resulting in turning around, the screw part 1112 in the fluid control valve 1100 is unable to bear the elastic force of the compression spring 1101, and in a worst case, the main body 1102 and the upper body 1103 could be broken apart.

The present invention has been made in view of the above circumstances and has an object to overcome the above problems and to provide a fluid control valve capable of preventing looseness of a screw part between a valve main body and a valve upper body.

To achieve the purpose of the invention, there is provided a fluid control valve comprising a diaphragm, a resin valve main body comprising a valve seat with which the diaphragm will come into or out of contact, a resin valve upper body threadedly engaged with the valve main body, and a holding member engaging with the valve main body and the valve upper body respectively to keep a threaded engagement between the valve main body and the valve upper body.

DETAILED DESCRIPTION OF THE PREFERRED EMBODIMENTS

A detailed description of preferred embodiments of a fluid control valve embodying the present invention will now be given referring to the accompanying drawings.

First Embodiment

<Exterior Configuration of a Fluid Control Valve>

Figure 1:
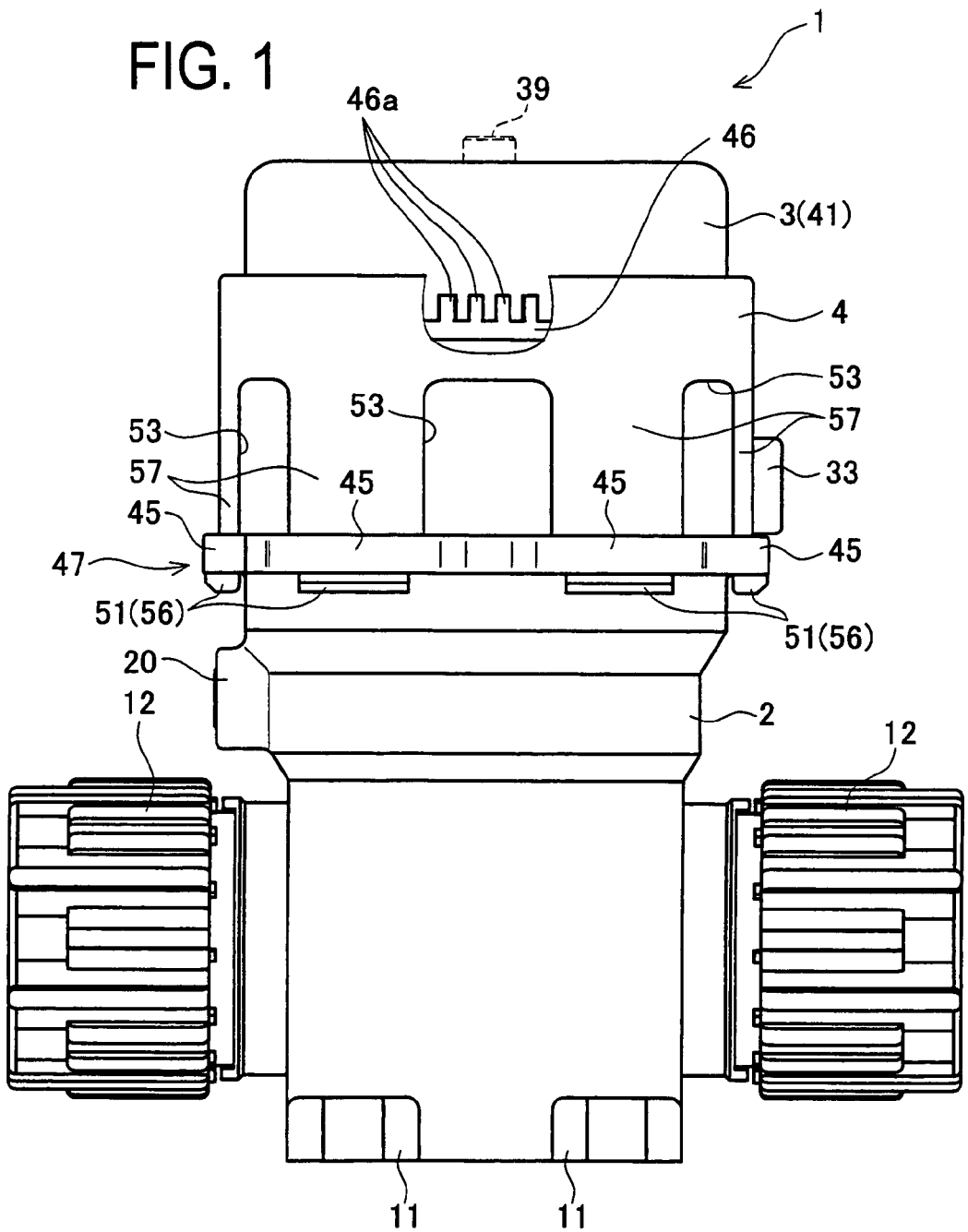
FIG. 1 is a front view of a fluid control valve in a first embodiment of the present invention.

FIG. 1 is a front view of a fluid control valve 1 in a first embodiment of the present invention.

As shown in FIG. 1, the fluid control valve 1 in the first embodiment is exteriorly configured with a valve main body (hereinafter, "main body") 2 and a valve upper body (hereinafter, "upper body") 3, and a holding member 4 is mounted to surround the main body 2 and the upper body 3. The fluid control valve 1 is for example, joined with a cleaning device for a semiconductor manufacturing process through a mounting part 11 formed in the main body 2, and also incorporated in a cleaning liquid supply line through joints 12, 12 to control flow rate of cleaning liquid to be supplied to a wafer.

<Interior Configuration of the Fluid Control Valve>

Figure 2:
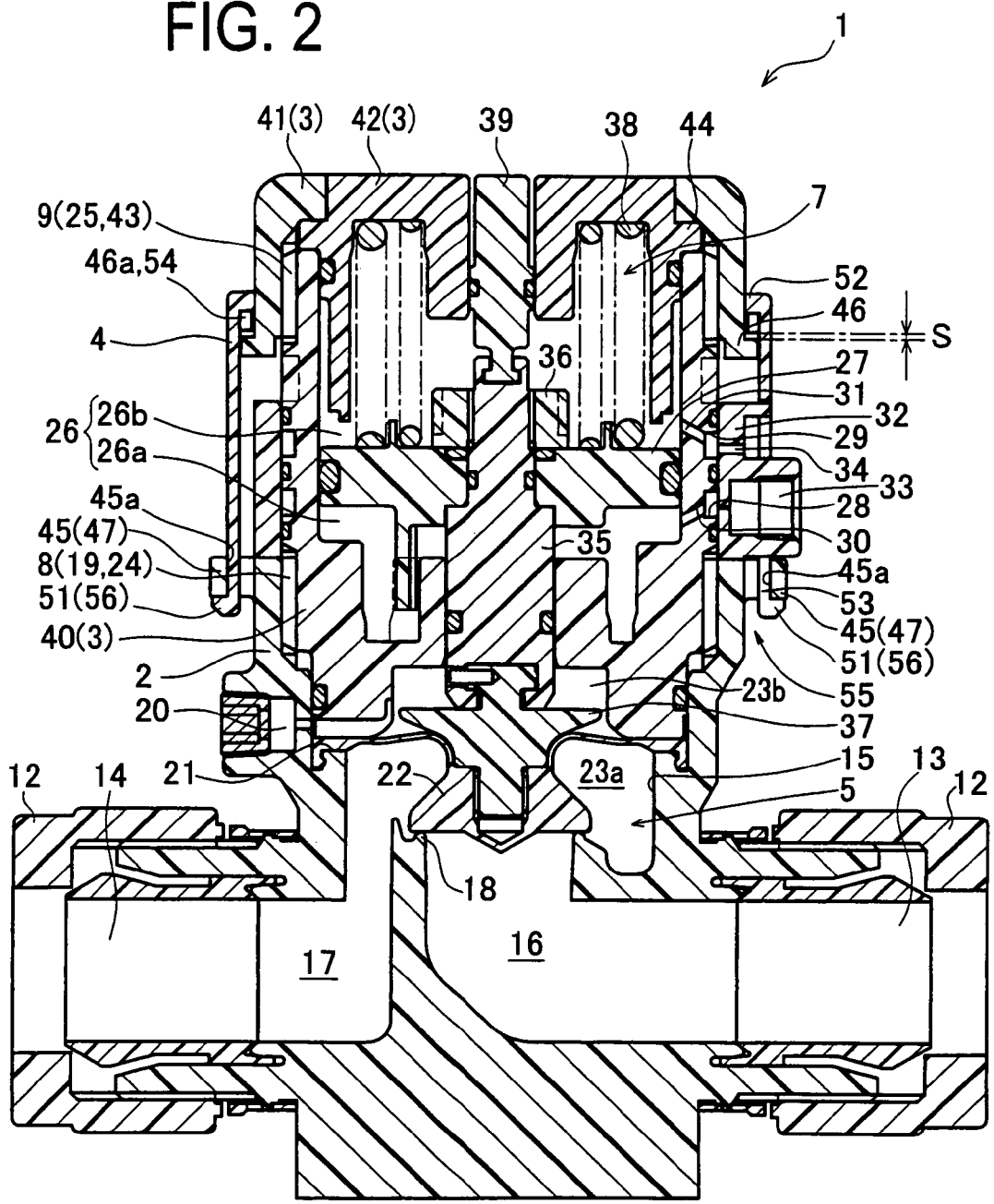
FIG. 2 is a sectional view of the fluid control valve in FIG. 1.

FIG. 2 is a sectional view of the fluid control valve 1 in FIG. 1.

In the fluid control valve 1, a valve section 5 is driven by an air-operated mechanism 7. All the components of the fluid control valve 1 except a compression spring 38 are made without using metal, and the fluid control valve 1 is designed metal-free in order to enable the use of the fluid control valve 1 in high corrosive atmosphere. The upper body 3 is screwed in the main body 2 by means of a first screw part 8.

<Configuration of the Valve Main Body>

The main body 2 is formed with a first port 13 and a second port 14 opening at each side of the main body 2, and a cylindrical recess 15 cylindrically formed opening in a top surface of the main body 2. The cylindrical recess 15 communicates with the first port 13 and the second port 14 respectively through a first passage 16 and a second passage 17 formed in the main body 2. At a bottom of the cylindrical recess 15 where the first passage 16 has an opening, a valve seat 18 is provided circumferentially at a periphery of the opening.

The main body 2 includes a first internal thread 19 configuring the first screw part 8 at an inner periphery of an open end portion of the cylindrical recess 15. Further, a shoulder 21 for positioning a diaphragm 22 is annularly formed at a deeper side (a lower side in FIG. 2) than a position of the internal thread 19 in the main body 2. A peripheral end portion of the diaphragm 22 is firmly held between the shoulder 21 of the main body 2 and a bottom surface of the upper body 3 to sealingly divide a space between the main body 2 and the upper body 3 into an operating chamber 23a and a back-pressure chamber 23b. In the main body 2, a detecting port 20 is provided to communicate with the back-pressure chamber 23b. The detecting port 20 is provided to collect fluid leaking to the back-pressure chamber 23b and delivering the leaking fluid to a fluid leakage detecting device.

Figure 3:
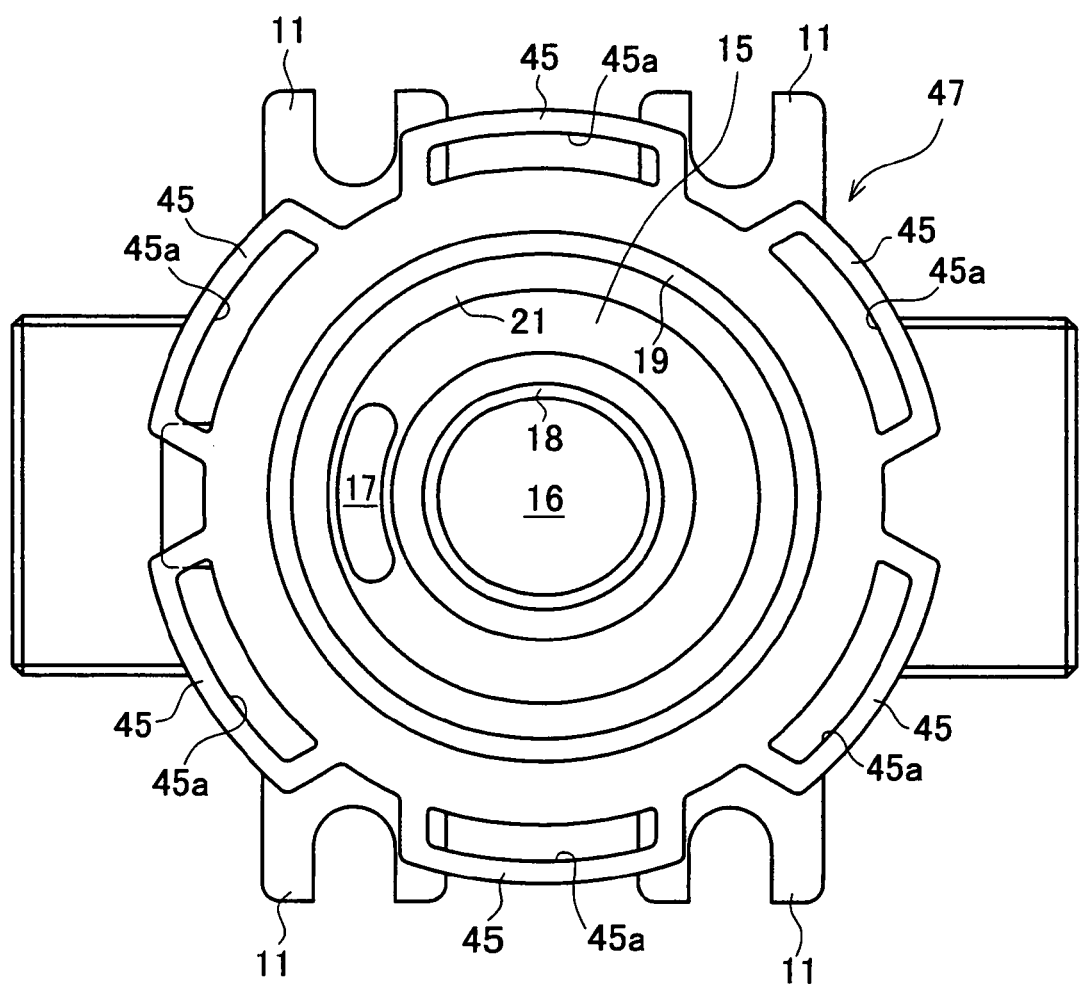
FIG. 3 is a top view of a valve main body.

FIG. 3 is a top view of the main body 2.

In the main body 2, a locking member 47 is provided on the outer periphery of the open end portion of the cylindrical recess 15. The locking member 47 is formed with a plurality of first catching parts 45 shaping a concavo-convex shape. The plurality of first catching parts 45 are provided at equally spaced intervals in a circumferential direction along an outer periphery of the main body 2, i.e., in a direction to turn the upper body 3. Each of the first catching parts 45 is provided protruding outward from the outer periphery of the main body 2. Holes 45a are formed to penetrate through the first catching parts 45 along an axial direction (top-down direction in FIG. 2).

The main body 2 will be exposed directly to a chemical liquid and hence is made of resin material with high corrosion resistance and high thermal resistance (for example PFA (tetrafluoroethylene perfluoroalkyvinyl ether copolymer resin) or PTFE (polytetrafluoroethylene)).

<Configuration of the Valve Upper Body>

As shown in FIG. 2, the upper body 3 is exteriorly configured with a cylinder 40, a cover 41, and a spring bearing 42. The cylinder 40 is a cup-like shape having one closed end. On the outer periphery of the cylinder 40, a first external thread 24 configuring the first screw part 8 and a second external thread 25 configuring the second screw part 9 are formed. The cover 41 is of a cup-like shape to cover an upper open end of the cylinder 40. On an inner periphery of the cover 41, a second internal thread 43 configuring the second screw part 9 is formed to engage with the second external thread 25. The cover 41 is formed on its closed side with a hole in which the spring bearing 42 is fitted. The spring bearing 42 includes a flange 44 that is supported between the cylinder 40 and the cover 41. In the cover 41, the spring bearing 42 is fit into the fitting hole so that the flange 44 is held against an inner periphery of the cover 41. The second internal thread 43 is screwed in the second external thread 25 to hold the flange 44 between the cover 41 and the cylinder 40. A piston chamber 26 is formed as a space defined by the spring bearing 42 and the cylinder 40.

A piston 27 is installed to be movable in the piston chamber 26 to divide the piston chamber 26 into a primary chamber 26a and a secondary chamber 26b. On the outer periphery of the cylinder 40, a first annular peripheral groove 28 and a second annular peripheral groove 29 are circumferentially formed in parallel between the first external thread 24 and the second external thread 25. The first annular peripheral groove 28 communicates with the primary chamber 26a through a first communication hole 30 formed in the cylinder 40. The second annular peripheral groove 29 communicates with the secondary chamber 26b through the second communication hole 31 formed in the cylinder 40.

Openings of the first and second annular peripheral grooves 28 and 29 are sealed tightly by an annular member 32 mounted on the outer periphery of the cylinder 40. The annular member 32 with a cylindrical shape is supported by a top surface of the main body 2 and mounted in the cylinder 40 to be freely rotatable. The annular member 32 is provided with an operation port 33 and a vent 34 in places corresponding to the first and second annular peripheral grooves 28 and 29 respectively. Therefore, the operation port 33 and the vent 34 can communicate with the primary and secondary chambers 26a and 26b through the first and second annular peripheral grooves 28 and 29 and through the first and second communication holes 30 and 31 even if the annular member 32 rotates around the cylinder 40 to change the positions of the operation port 33 and the vent 34.

A piston rod 35 is combined with the piston 27 by means of nuts 36. The piston rod 35 is slidably placed through the cylinder 40 so that a bottom part of the piston rod 35 protrudes into the main body 2. A diaphragm 22 is connected to the bottom part of the piston rod 35 through a diaphragm support member 37. A compression spring 38 mounted in a contraction state between the piston 27 and the spring bearing 42 always urges the piston 27 toward the valve seat 18 (downward in FIG. 2). As a result, the elastic force of the compression spring 38 ensures valve-closing force of the valve section 5 to make the diaphragm 22 in contact with the valve seat 18.

Consequently, while operation fluid is not supplied to the operation port 33, the piston 27 stays down by the elastic force of the compression spring 38 to hold the diaphragm 22 into contact with the valve seat 18. When the operation fluid is supplied to the operation port 33 and inner pressure of the primary chamber 26a overcomes the elastic force of the compression spring 38, the piston 27 is moved up to make the diaphragm 22 out of contact with the valve seat 18. At this time, a valve opening degree is determined by balance between the inner pressure of the primary chamber 26a and the elastic force of the compression spring 38. An indicator 39 is mounted to be movable up and down through the spring bearing 42. The indicator 39 is connected to the piston rod 35 and will protrude from the spring bearing 42 in accordance with the valve opening degree.

Further, the elastic force of the compression spring 38 acts on the cover 41 of the fluid control valve 1 through the spring bearing 42. Specifically, this force acts directly upward (in an axial direction) on the cover 41, thus preventing the second screw part 9 from becoming loosened.

Figure 5:
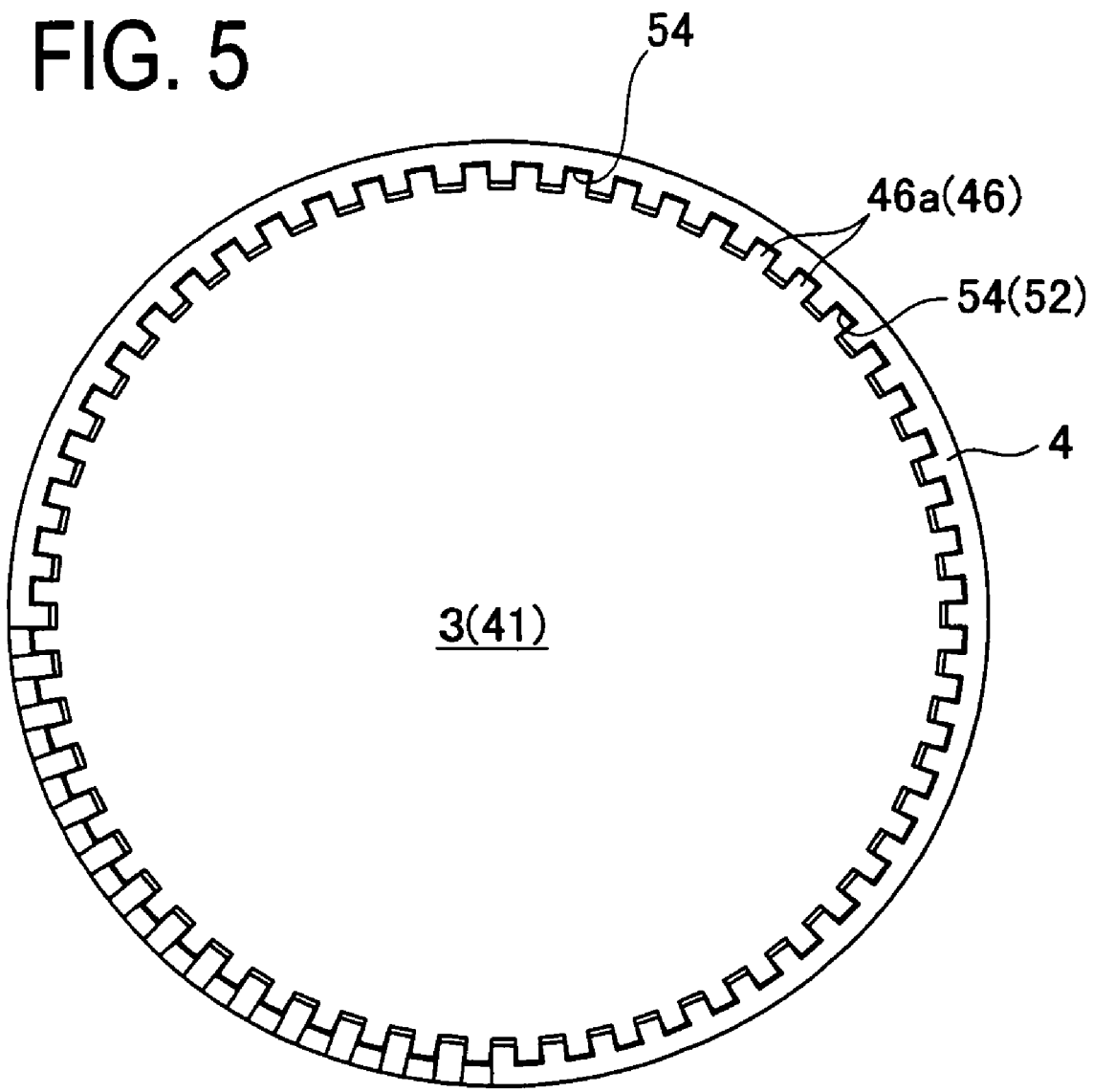
FIG. 5 is an explanatory schematic view showing a state where a second protrusion and a second hooked portion are engaged.

FIG. 5 is an explanatory schematic view showing a state where a second catching part 46 and a second hooked portion 52 are engaged together.

As shown in FIGS. 1, 2, and 5, the second catching part 46 is circumferentially provided in the cover 41 along an outer periphery of the open end thereof. The second catching part 46 protrudes outwardly from an outer peripheral surface of the cover 41. Lower guide part 46a of the second catching part 46 is formed at one side opposite from the main body 2 (an upper side in FIG. 1 and FIG. 2). The lower guide part 46a is formed with protrusions and recesses formed in an axial direction of the cover 41.

In such upper body 3, each component except the compression spring 38 and a sealing member requires corrosion resistance against the corrosion atmosphere and enough strength to overcome actions of the piston 27 and pressure of the operation fluid. In order to meet such requirements, each component except the compression spring 38 and the sealing member is made of such material that has enough corrosion resistance and strength (for example, PVDF (polyvinylidene difluoride) or the like). The compression spring 38 is made of metal and is covered with a corrosion-resistance coating on an outer surface thereof. The sealing member is made of elastic rubber material such as perfluoro elastomer or fluorocarbon rubber.

<Configuration of the Holding Member>

As shown in FIGS. 1 and 2, the holding member 4 is engaged with the main body 2 and the upper body 3 to keep them screwed together. Therefore, the holding member 4 is made of resin material that has corrosion resistance and is hard to be deformed (for example PVDF (polyvinylidene difluoride) or the like). The holding member 4 is formed in a cylindrical shape.

As shown in FIG. 2, the holding member 4 is provided with engagement portions 56 to engage with a locking member 47 of the main body 2 on a first open end side (an open end closer to the main body 2) of the holding member 4. The engagement portions 56 include respective separate pieces 57 separated from one another by a plurality of cutouts 53 each being formed extending in the axial direction and opening in the first open end. The respective separate piece 57 is placed corresponding to a position of the first catching parts 45 of the locking member 47. A first hooked portions 51 are formed protruding radially outwardly from a lower outer peripheral surface (an outer periphery of the first open end of the holding member 4) of the respective separate piece 57. Further, a second hooked portion 52 is formed protruding radially inwardly from a second open end (an open end closer to the upper body 3) of the holding member 4. The second hooked portion 52 is formed, on one side facing the main body 2 (a lower side in FIG. 2), with an upper guide part 54 which meshes with the lower guide part 46a of the cover 41. The upper guide part 54 is formed with protrusions and recesses in the axial direction of the holding member 4 so that the protrusions and recesses slidably engage with the recesses and protrusions of the lower guide part 46a. The upper guide part 54 is designed to be lower in height than the lower guide part 46a, forming a clearance S in the axial direction between the upper guide part 54 and the second catching part 46. The clearance S is designed to have enough distance to allow the peripheral end portion of the diaphragm 22 to disengage from a shoulder 21, thereby causing fluid leakage from the operating chamber 23a to the back-pressure chamber 23b.

Figure 4:
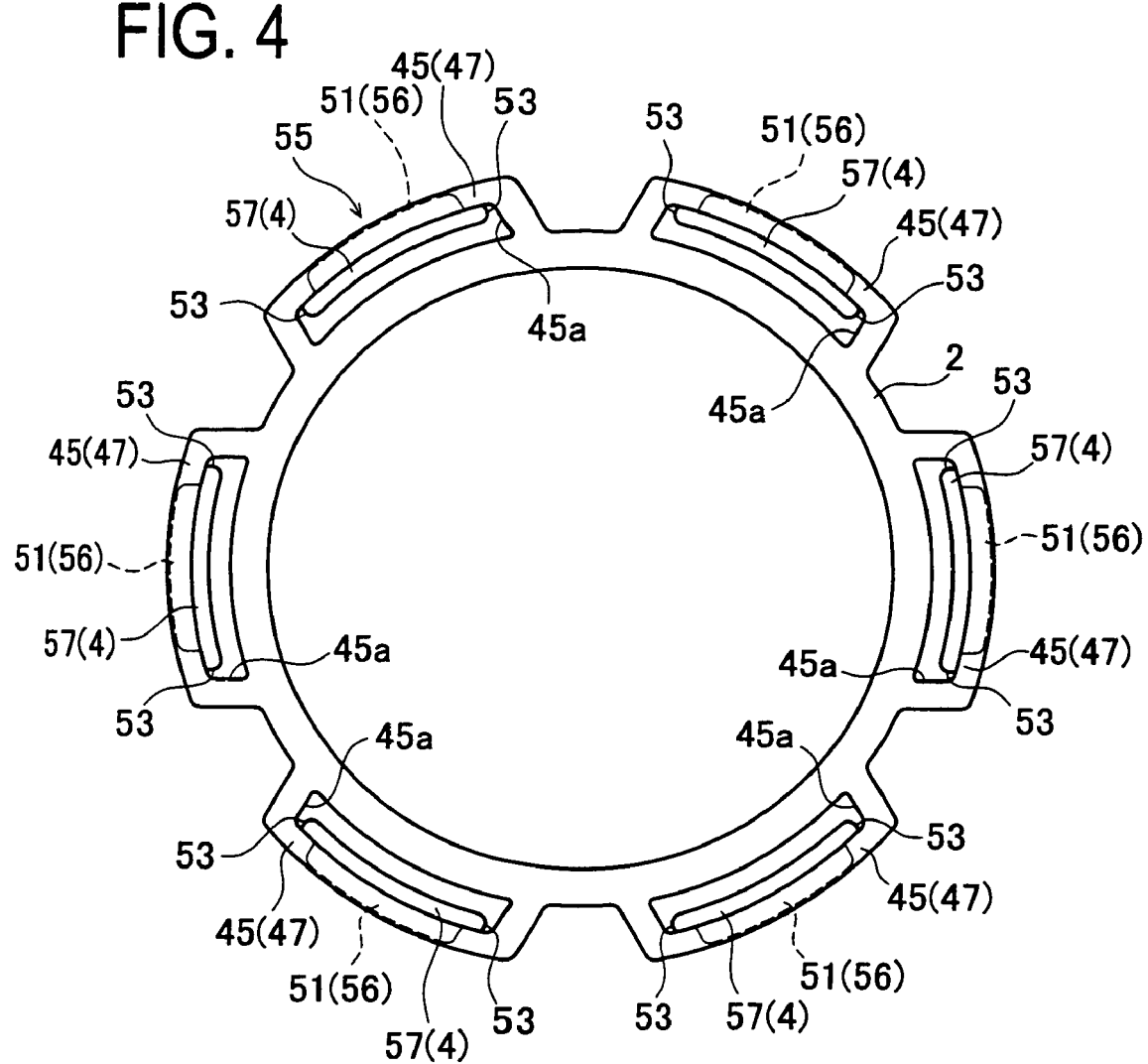
FIG. 4 is a schematic view of a rotation restricting section.

FIG. 4 is a schematic view of a rotation restricting section 55.

As shown in FIG. 4, the holding member 4 is restrained from rotating with respect to the main body 2 by the separate pieces 57 inserted through the holes 45a of the first catching parts 45. In other words, the rotation restricting section 55 is formed with the first catching parts 45 (the locking member 47) and the separate pieces 57 (the engagement portions 56).

<Detachment and Attachment of the Holding Member>

As shown in FIG. 2, in the holding member 4, the upper body 3 is inserted from the open end (the lower end in FIG. 2) with the first hooked portions 51 until the upper guide part 54 is engaged with the lower guide part 46a of the cover 41 with the clearance S therebetween. At the same time, each separate piece 57 is pressed radially inward to pass through the holes 45a of the first catching parts 45. Subsequently, the separate pieces 57 are recovered, making the first hooked portions 51 engage the first catching parts 45. The holding member 4 can be detached by reversing the above procedure.

In addition, when the holding member 4 is mounted in the fluid control valve 1, the separate pieces 57 are individually surrounded by the first catching parts 45. Therefore, even if an operator's hand bumps or touches the holding member 4 for example, the first hooked portions 51 are not disengaged from the first catching parts 45.

<Function Explanation>

The fluid control valve 1 with the above configuration is incorporated in a cleaning device by means of the mounting parts 11. When the operation fluid is not supplied to the operation port 33, the fluid control valve 1 is closed, shutting off the flow of chemical liquid. On the other hand, when the operation fluid is supplied to the operation port 33, the fluid control valve 1 is opened, allowing the chemical liquid to flow through the second port 14.

In the case where the chemical liquid heated to a high temperature to be supplied in an activated state to a wafer, the main body 2, upper body 3, and others made of resin are liable to thermally expand. On the other hand, when pure water is let flow for replacement of chemical liquid, the resin-made main body 2, the resin-made upper body 3 and others thermally contract. When thermal expansion and thermal contraction are repeated, fastening strength of the first screw part 8 becomes weakened due to creep, resulting in that the first screw part 8 is easily rotated.

However, in the fluid control valve 1, the separate pieces 57 of the holding member 4 are inserted into the holes 45a of the first catching parts 45 formed in the main body 2. When the upper body 3 engaged with the holding member 4 through the second catching part 46 attempts to rotate integrally with the holding member 4, each side surface of the separate pieces 57 defining the cutouts 53 comes in contact with each end of the holes 45a (each inner edge of each first catching part 45 in the circumferential direction), thereby holding the holding member 4 against rotation. Therefore, the upper body 3 is restrained from rotating by resistance generated between the holding member 4 and the main body 2.

In this situation, when the upper body 3 attempts to rotate integrally with the holding member 4 relative to the main body 2, in the holding member 4, force is generated in a twisted direction because the holding member 4 is supported by the rotation restricting section 55 at the side closer to the main body 2. However, in the holding member 4, the first hooked portions 51 and the second hooked portions 52 are facing opposite directions (radially outward and inward directions) each other. Therefore, even if the force in the twisted direction is generated in the holding member 4, the first hooked portions 51 are not disengaged from the first catching parts 45.

As mentioned above, in the fluid control valve 1, the upper body 3 does not rotate relative to the main body 2 and hence the first screw part 8 is not loosened. Consequently, sealing strength to hold the peripheral end portion of the diaphragm 22 between the main body 2 and the upper body 3 is maintained, and accordingly the valve function does not decline.

In addition, such a case can be also prevented that the main body 2 and the upper body 3 are taken apart due to larger elastic force of the compression spring 38 than the fastening force of the first screw part 8, resulting in that the chemical liquid is scattered all around.

There is a case that an operator accidentally turns the upper body 3 with respect to the main body 2. At this time, the holding member 4 restrains the rotation of the upper body 3 with respect to the main body 2 and resists rotation caused by the operator. Upon feeling this resistance, the operator stops trying to rotate the upper body 3 with respect to the main body 2. In this way, there is no possibility that an operator makes the upper body 3 rotate against the main body 2 to loosen the first screw part 8. Therefore, decline in the valve function and breaking apart of the main body 2 and the upper body 3 can be prevented as mentioned above.

By the way, in the fluid control valve 1, chemical fluid leaking to the back-pressure chamber 23b of the diaphragm 22 is detected by the fluid leakage detecting apparatus which is connected to the detecting port 20. When the fluid leakage detecting apparatus detects the leakage of chemical fluid, the fluid control valve 1 is placed in a valve closing state to stop the flow of the chemical fluid from the cleaning device.

Repeated opening and closing operations of the fluid control valve 1 may cause deterioration of the first screw part 8 to form a clearance or backlash between the first internal thread 19 and the first external thread 24. In this case, the upper body 3 could be lifted up due to the fluid pressure generated by the chemical liquid acting the diaphragm 22 even if the upper body 3 does not rotate against the main body 2. If the fluid pressure is large, the main body 2 and the upper body 3 may be broken apart and the chemical liquid spouts out before the fluid leakage detecting apparatus detects the chemical liquid leaking to the back-pressure chamber 23b.

However, the fluid control valve 1 provides the clearance S in the pressurizing direction of the chemical liquid between the second catching parts 46 formed on the outer periphery of the upper body 3 (the cover 41) and the second hooked portions 52 engaged with the second catching parts 46. Therefore, even if the upper body 3 is lifted up by the clearance S from the main body 2, the second catching part 46 is then locked by the second hooked portions 52 of the holding member 4, so that the upper body 3 is held by the main body 2 through the holding member 4 against further upward movement. In other words, the holding member 4 can prevent the main body 2 and the upper body 3 from being broken apart.

When the upper body 3 moves upward by the clearance S, sealing strength of the diaphragm 22 whose end portion is supported between the main body 2 and the upper body 3 declines. Accordingly, the chemical liquid leaks from the operation chamber 23a to the back-pressure chamber 23b. This leaking chemical liquid is collected by the fluid leakage detecting apparatus through the detecting port 20. Consequently, an opening/closing operation of the fluid control valve 1 is stopped to prevent more pressurizing of the upper body 3 by the fluid pressure. In this way, the main body 2 and the upper body 3 remain to be supported by the holding member 4.

As mentioned above, the fluid control valve 1 is arranged such that the clearance S is provided at a part where the holding member 4 and the upper body 3 are engaged together, so that the upper body 3 and the main body 2 are allowed to move slightly toward opposite directions. Accordingly, the chemical liquid leaking to the back-pressure chamber 23b of the diaphragm 22 can be collected by the fluid leakage detecting apparatus through the detecting port 20. Consequently, breaking apart of the main body 2 and the upper body 3 and spouting out of the chemical liquid due to the fluid pressure of the chemical liquid can be prevented in advance.

In addition, when the upper body 3 is lifted up by the fluid pressure, the lower guide part 46a is guided by the upper guide part 54 of the holding member 4. Therefore, the upper body 3 is lifted up along the axial direction (straight upward) without rotating relative to the holding member 4 and the main body 2, so that the first screw part 8 is not loosened.

Operations and Advantages of the Fluid Control Valve in the First Embodiment

As mentioned above, in the fluid control valve 1 of the first embodiment, the holding member 4 is engaged with the main body 2 and the upper body 3 (the cover 41) to hold the main body 2 and the upper body 3 screwed together. Therefore the upper body 3 does not rotate with respect to the main body 2 and the first screw part 8 which fastens the main body 2 and the upper body 3 cannot be loosened.

Moreover, in the fluid control valve 1 of the first embodiment, when the upper body 3 engaged with the holding member 4 through the second catching part 46 attempts to rotate integrally with respect to the main body 2, the holding member 4 is restrained from rotating by the separate pieces 57 engaged with the holes 45a of the first catching parts 45 provided on the outer periphery of the main body 2 in the rotation direction of the upper body 3. Therefore, the fluid control valve 1 of the first embodiment is capable of restraining the rotation of the upper body 3 with respect to the main body 2.

Second Embodiment

Figure 6:
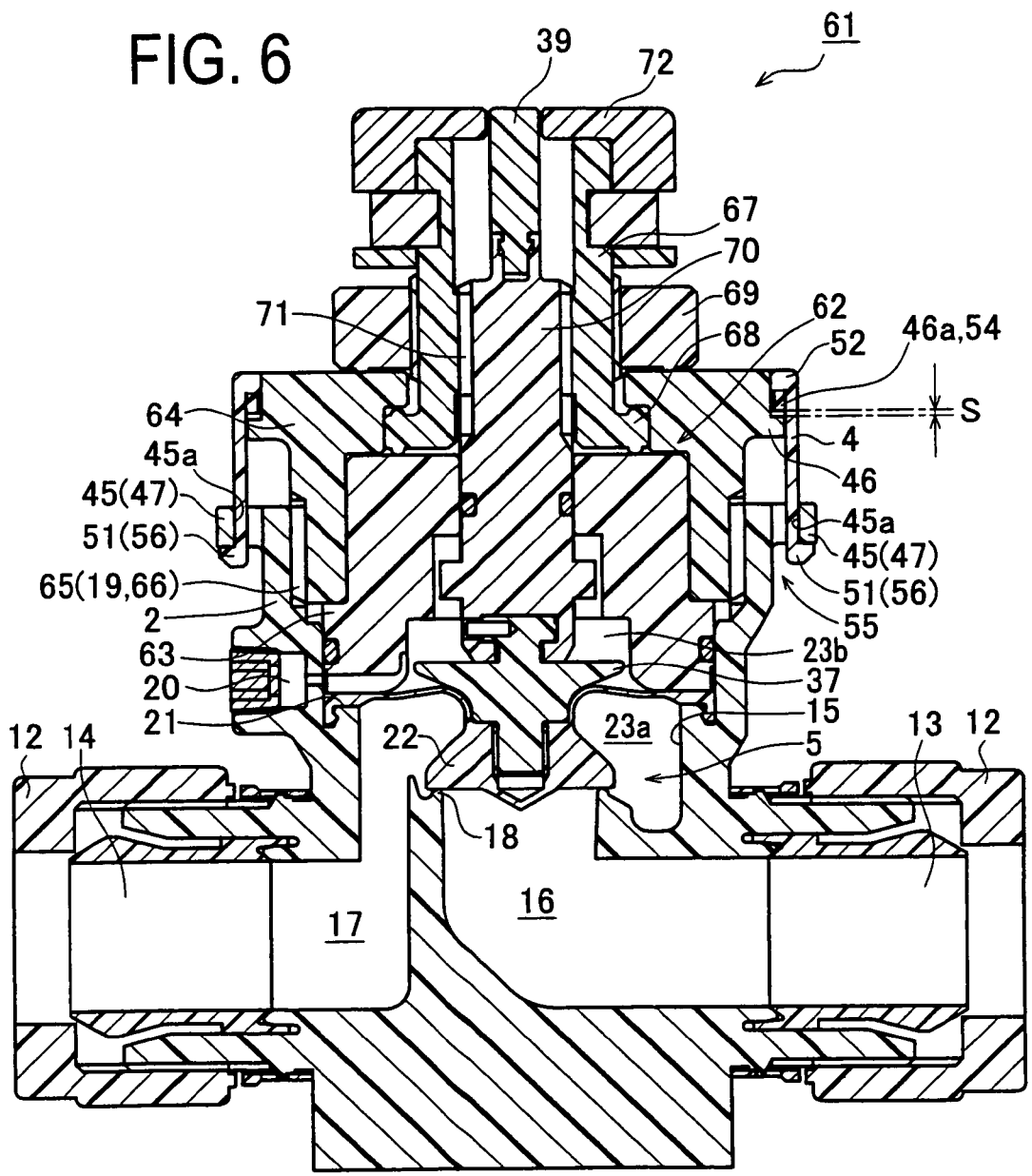
FIG. 6 is a sectional view of a fluid control valve in a second embodiment.

Next, a detailed description of a second embodiment of the present invention will now be given referring to the accompanying drawings. FIG. 6 is a sectional view of a fluid control valve 61 in the second embodiment of the present invention.

The fluid control valve 61 is different from the fluid control valve 1 of the first embodiment as for a configuration that includes a manual-operated mechanism 62 instead of the air-operated mechanism 7. The following explanation is focused on features different from the first embodiment. Same configurations as those of the fluid control valve in the first embodiment are designated by the same reference codes and their descriptions are omitted.

<Configuration of the Fluid Control Valve>

The fluid control valve 61 in the second embodiment includes a valve upper body (hereinafter, "upper body") 64 having a manual-operated mechanism 62 which applies driving force to the diaphragm 22 by a screw motion.

The upper body 64 is provided with an external thread 66 engaged with the internal thread 19 of the main body 2. The internal thread 19 and the external thread 66 configure a screw part 65 to threadedly engage the upper body 64 with the main body 2. The upper body 64 presses a diaphragm retainer 63 down toward the main body 2 to hold the diaphragm retainer 63 against the main body 2. A peripheral end portion of the diaphragm 22 is sealingly retained between a bottom surface of the diaphragm retainer 63 and the shoulder 21 of the main body 2.

A cylindrical body 67 of the manual-operated mechanism 62 is engaged with an operation rod 70 slidably inserted to be movable through the diaphragm retainer 63 by means of an adjustment thread 71. The cylindrical body 67 passes through the upper body 64 so that a flange 68 is held against an inner periphery of the upper body 64. The cylindrical body 67 is fixed to the upper body 64 by fastening a protruding part of the cylindrical body 67 from the upper body 64 with a nut 69. The flange 68 of the cylindrical body 67 is slidable in contact with the upper body 64 and the diaphragm retainer 63 respectively, so that the cylindrical body 67 is held rotatable with respect to the upper body 64. The cylindrical body 67 is provided on its top with a handle 72 for turning the cylindrical body 67.

Further, each component except the sealing member in the fluid control valve 61 of the second embodiment is made of resin material. In the second embodiment, the main body 2 is made of PFA, and all the components except the main body 2 are made of PVDF.

<Function Explanation>

In the fluid control valve 61, when the handle 72 is turned clockwise, the cylindrical body 67 rotates integrally with the handle 72 to lift the operation rod 70 through the screw motion of the adjustment screw 71. The operation rod 70 pulls up the diaphragm 22 through the diaphragm support member 37 to make the diaphragm 22 out of contact with the valve seat 18.

On the other hand, in the fluid control valve 61, when the handle 72 is turned counterclockwise, the cylindrical body 67 rotates integrally with the handle 72 to move the operation rod 70 downward by the screw motion of the adjustment screw 71. The operation rod 70 then pushes the diaphragm 22 downward through the diaphragm support member 37 to make the diaphragm 22 come in contact with the valve seat 18.

In addition, the indicator 39 mounted on a top end of the operation rod 70 is inserted to the handle 72 and will protrude from the handle 72 in accordance with a valve opening degree.

Operations and Advantages of the Fluid Control Valve in the Second Embodiment In the fluid control valve 61 of the second embodiment, when the handle 72 is turned to adjust the valve opening degree by means of the adjustment screw 71, the upper body 64 attempts to rotate integrally with the cylindrical body 67. However, the rotation restricting section 55 of the holding member 4 restrains the upper body 64 from rotating with respect to the main body 2. Moreover, the fluid control valve 61 includes the first and second hooked portions 51 and 52 engaged with the first and second catching parts 45 and 46 respectively to hold the main body 2 and the upper body 64, so that the upper body 64 is restrained from rotating with respect to the main body 2. Consequently, in the fluid control valve 61, the upper body 64 does not rotate with respect to the main body 2 in association with the rotation of the adjustment screw 71 provided in the manual-operated mechanism 62. In other words, the screw part 65 can not be loosened.

Third Embodiment

Figure 7:
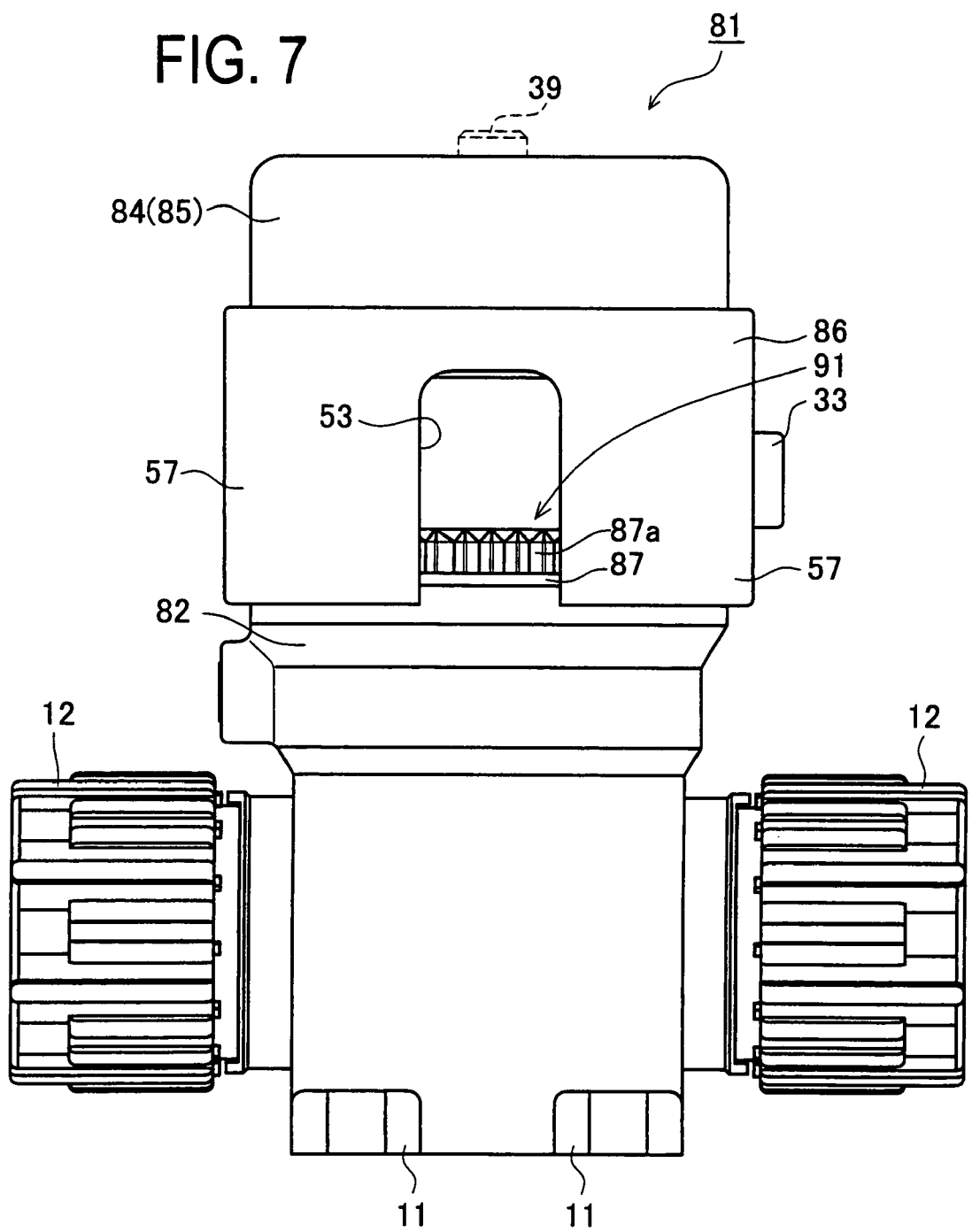
FIG. 7 is a front view of a fluid control valve in a third embodiment.
Figure 8:
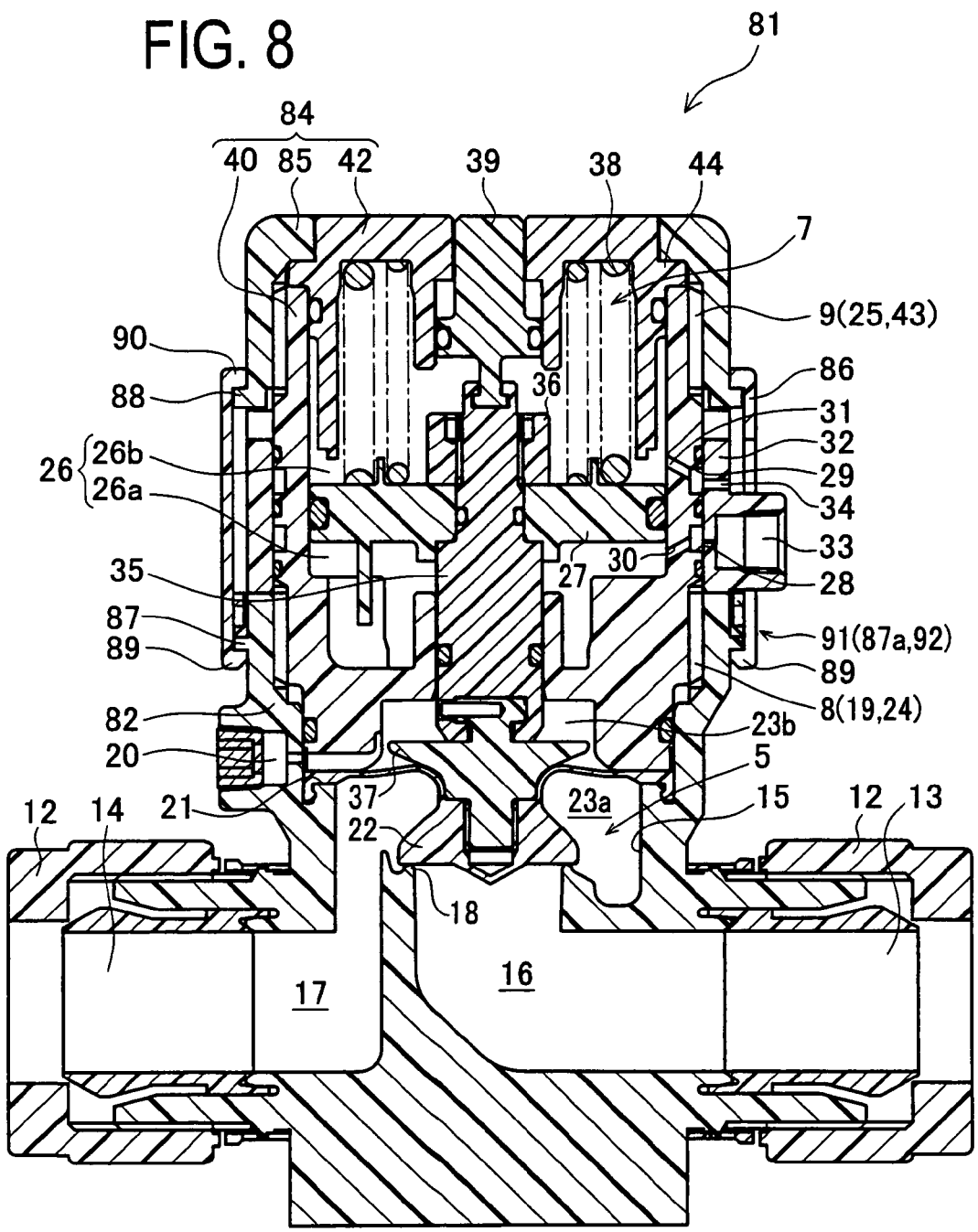
FIG. 8 is a sectional view of the fluid control valve in FIG. 7.
Figure 9:
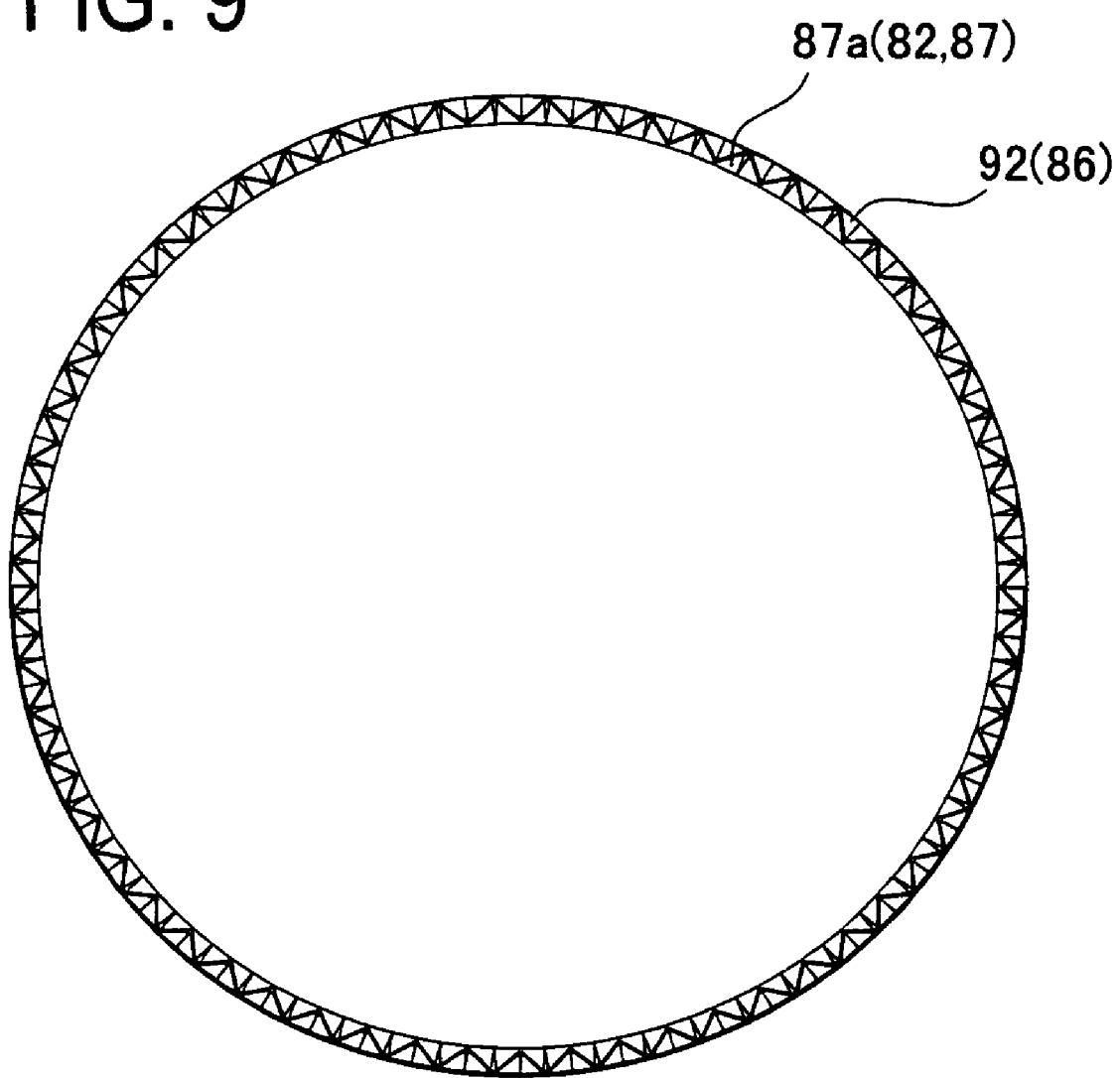
FIG. 9 is a schematic view of a rotation restricting section.

Next, a detailed description of a third embodiment of the present invention will now be given referring to the accompanying drawings. FIG. 7 is a front view of a fluid control valve 81 in the third embodiment of the present invention. FIG. 8 is a sectional view of the fluid control valve 81 in FIG. 7. FIG. 9 is a schematic view of a rotation restricting section 91.

The fluid control valve 81 of the third embodiment is configured as same as the fluid control valve of the first embodiment except structure of the rotation restricting section 91. Therefore, the following explanation is focused on features different from the first embodiment. Same configurations as those of the fluid control valve in the first embodiment are designated by the same reference codes and their descriptions are omitted.

As shown in FIG. 7, the fluid control valve 81 is exteriorly configured with a valve upper body (hereinafter, "upper body") 84 screwed in a valve main body (hereinafter, "main body") 82. A holding member 86 is mounted on the valve main body 82 and the upper body 84 circumferentially so as to keep the main body 82 and the upper body 84 screwed together. Further, in the third embodiment, the main body 82 is made of PFA, and the upper body 84 and the holding member 86 are made of PVDF.

As shown in FIG. 8, the main body 82 is provided with a first catching part 87 and a locking member 87a along an outer periphery of an open end portion (a top end surface in FIG. 8) of the cylindrical recess 15. The locking member 87a is of a knurled annular shape formed with ridges and valleys triangular in cross-section arranged at equally spaced intervals, as shown in FIG. 9.

The upper body 84 is constituted of a cover 85, the spring bearing 42, and the cylinder 40. The cover 85 is provided with a second catching part 88 circumferentially formed along an outer peripheral surface of the cover 85. The second catching part 88 protrudes outwardly from the outer peripheral surface of the cover 85.

As shown in FIG. 8, the holding member 86 is of a cylindrical shape provided with first hooked portions 89 and second hooked portions 90 respectively protruding radially inward at inner peripheral surfaces of a third open end and a fourth open end. As shown in FIGS. 8 and 9, the holding member 86 is provided with engagement portions 92 engaging with the locking member 87a along an inner peripheral surface of the holding member 86 on an axially inner side than a position of the first hooked portions 89. The engagement portions 92 are in a knurling shape formed with ridges and valleys triangular in cross-section.

<Detachment and Attachment of the Holding Member>

As shown in FIG. 8, the upper body 84 is inserted from an open end of the holding member 86 in which the cutout 53 opens and the first hooked portions 89 are provided. Then, each separate piece 57 is deformed outwardly so that the first hooked portions 89 go over the first catching part 87 and the locking member 87a of the main body 82. Subsequently, the separated pieces 57 are recovered making the first hooked portions 89 engage the first catching part 87 of the main body 82. At this time, the locking member 87a of the main body 82 and the engagement portion 92 of the holding member 86 are meshed together to provide the rotation restricting section 91. The second hooked portions 90 are engaged with the second catching part 88 in close contact relation therewith. Further, the holding member 86 can be detached by reversing the above procedures.

<Function Explanation>

In the fluid control valve 81, even if the upper body 84 attempts to rotate integrally with the holding member 86 with respect to the main body 82, the engagement portions 92 of the holding member 86 mesh with the locking member 87a of the main body 82 to restrain the holding member 86 from rotating. Consequently, the upper body 84 is restrained from rotating with respect to the main body 82 through the holding member 86.

Furthermore, in the fluid control valve 81, the first hooked portions 89 of the holding member 86 are hooked on the first catching part 87 of the main body 82 and the second hooked portions 90 of the holding member 86 are hooked on the second catching part 88 of the upper body 84, so that the holding member 86 holds the main body 82 and the upper body 84 by catching hold of respective first catching part 87 and second catching part 88 from both sides of the holding member 86 in the axial direction. Therefore, in a case that only the upper body 84 attempts to rotate with respect to the main body 82, resistance is generated at an engaging part of the holding member 86 and the upper body 84. As a result, the upper body 84 can not move in a direction opposite from a threadedly engaging direction in which the upper body 84 is threaded in the main body 82 (upward in FIG. 8). In other words, the upper body 84 is restrained from rotating with respect to the main body 82 through the holding member 86.

As mentioned above, in the fluid control valve 81, because the upper body 84 does not rotate with respect to the main body 82, the first screw part 8 can not be loosened. Therefore, problems such as decline in valve function or breaking apart of the main body 82 and the upper body 84 caused by the loosened first screw part 8 can be avoided.

Operations and Advantages in the Third Embodiment

In the fluid control valve 81 of the third embodiment, the knurling locking member 87a and the engagement portions 92 are meshed together to restrain the upper body 84 from rotating with respect to the main body 82. In short, the fluid control valve 81 of the third embodiment has the same operations and advantages with the fluid control valve 1 of the first embodiment.

In addition, in the fluid control valve 81 of the third embodiment, the holding member 86 catches hold of respective catching parts of the main body 82 and the upper body 84 axially from below and above to restrain the upper body 84 from moving in the direction opposite from the engaging direction, so that the upper body 84 can not rotate with respect to the main body 82. Consequently, in the fluid control valve 81, the main body 82 and the upper body 84 are restrained from rotating with respective to each other.

Moreover, in the fluid control valve 81 of the third embodiment, contact area between the locking member 87a of the main body 82 and the engagement portions 92 of the holding member 86 is large. Therefore, turning force acting while the rotation is disabled can be widely distributed over the holding member 86 and the main body 82 and hence durability of the rotation restricting section 91 (the locking member 87a and the engagement portions 92) can be enhanced.

Fourth Embodiment

Figure 11:
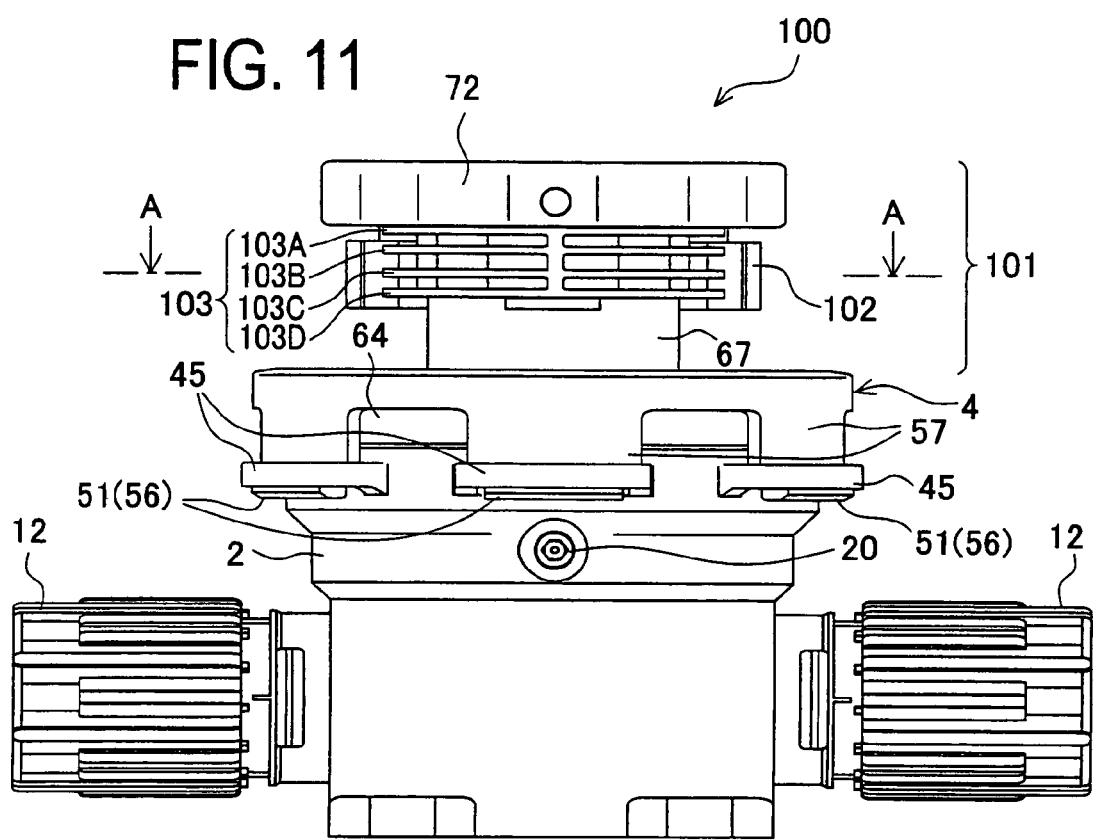
FIG. 11 is a front view of a fluid control valve in a fourth embodiment.
Figure 12:
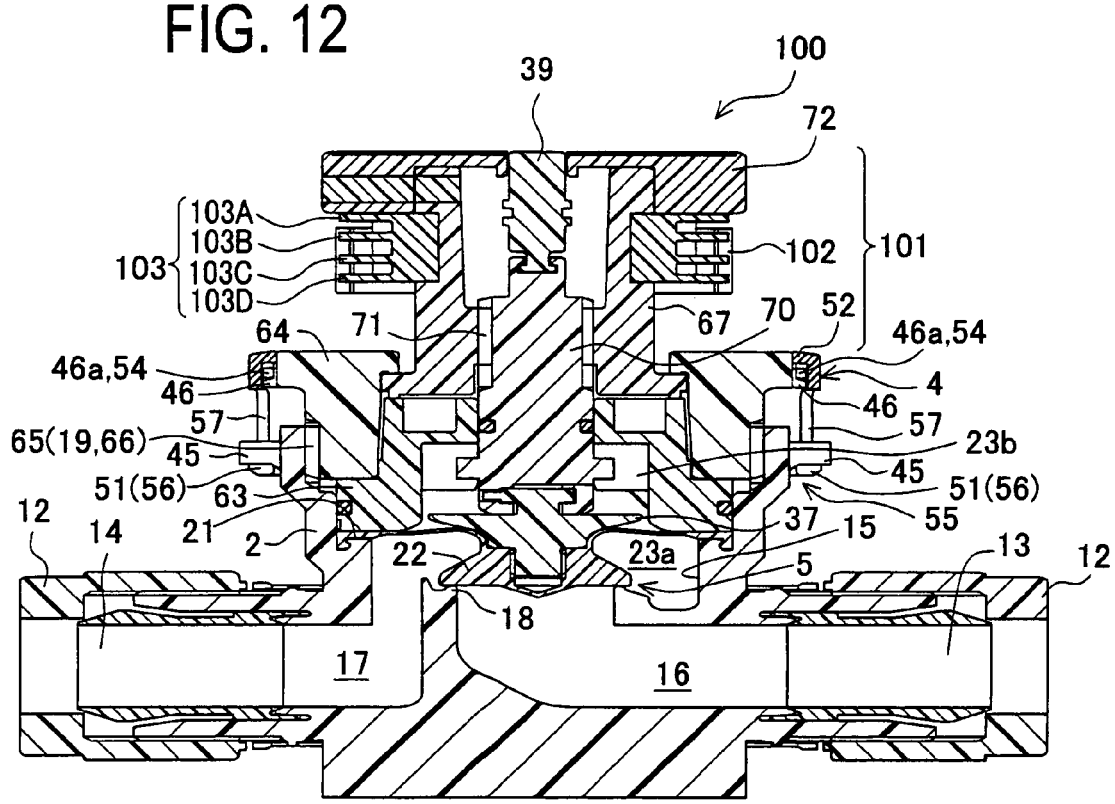
FIG. 12 is a sectional view of the fluid control valve in FIG. 11.
Figure 13:
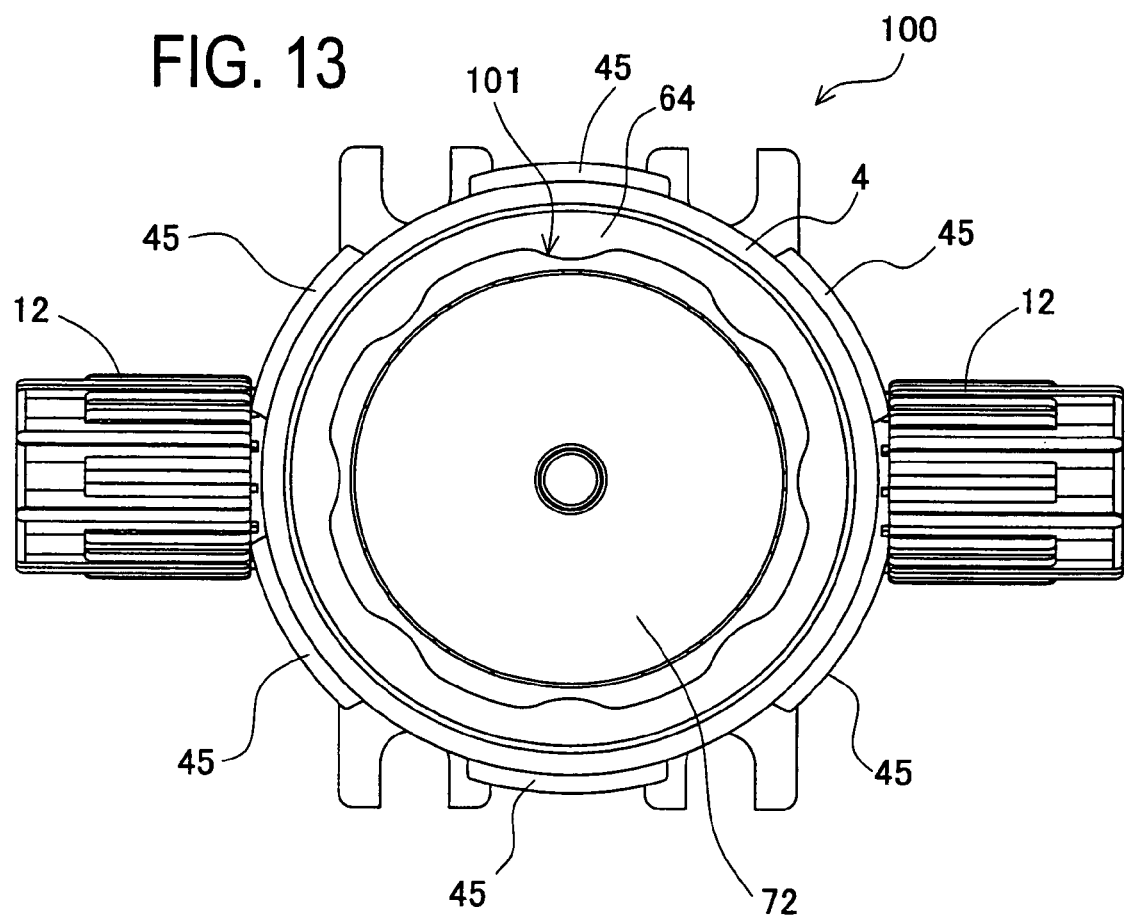
FIG. 13 is a plan view of the fluid control valve in FIG. 11.
Figure 14:
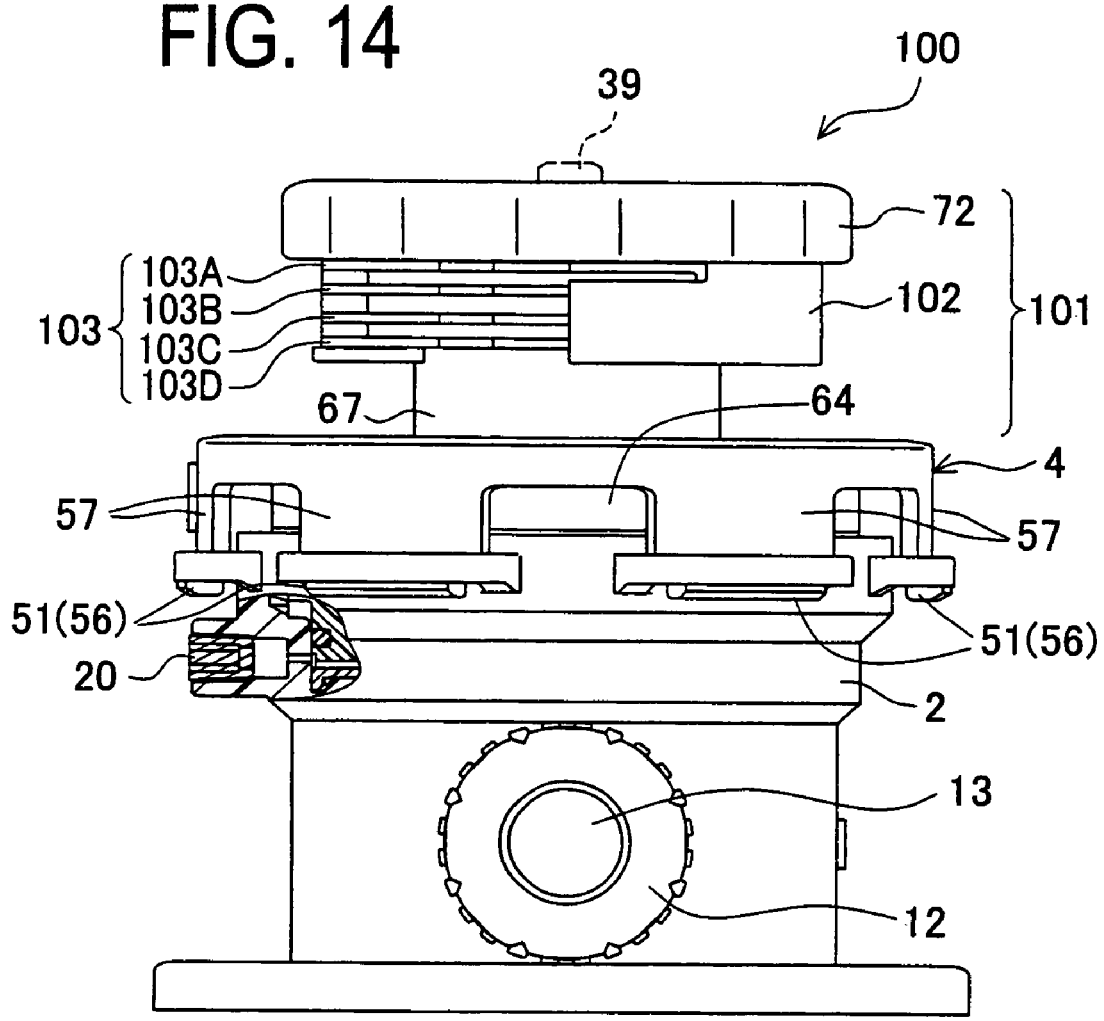
FIG. 14 is a right-side view of the fluid control valve in FIG. 11.
Figure 15:
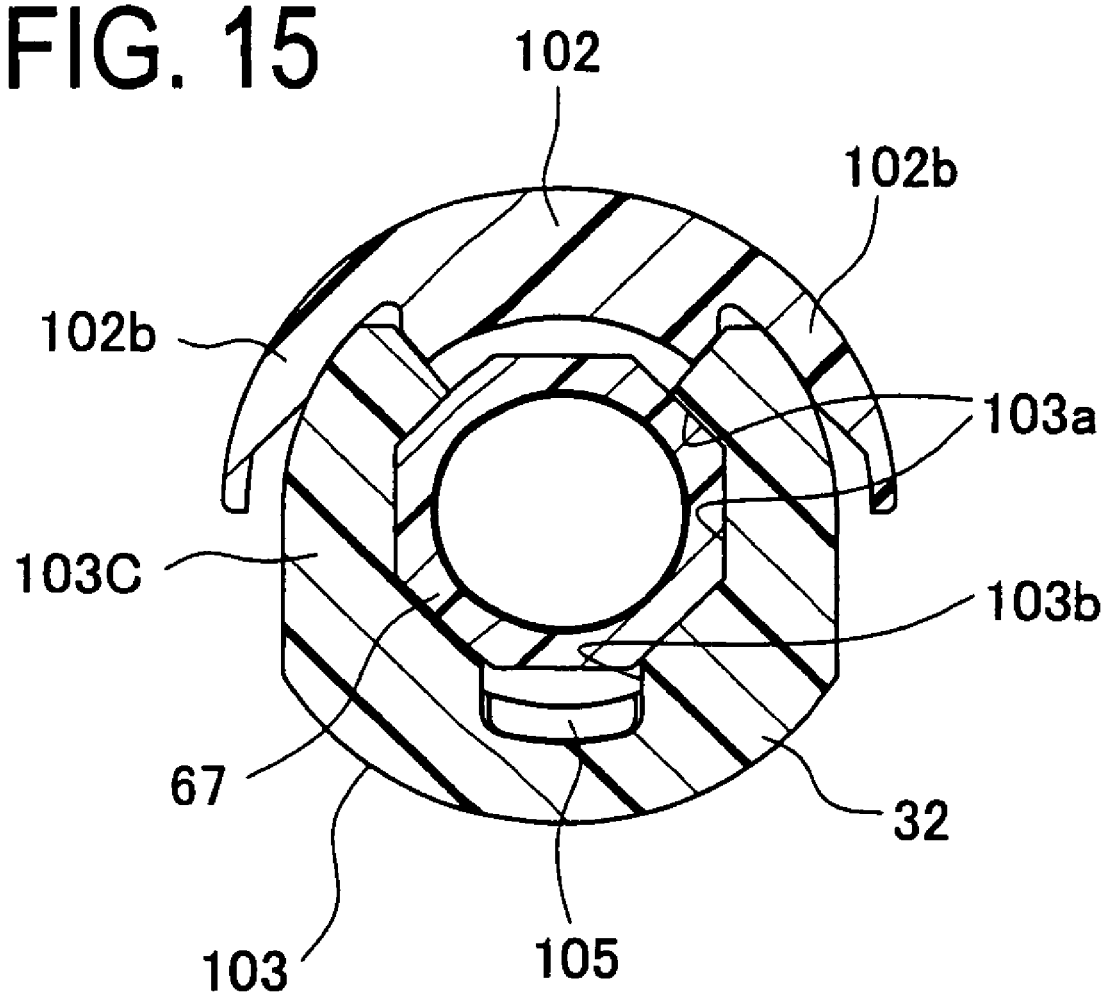
FIG. 15 is a sectional view of the fluid control valve taken along a line A-A in FIG. 11.
Figure 16:
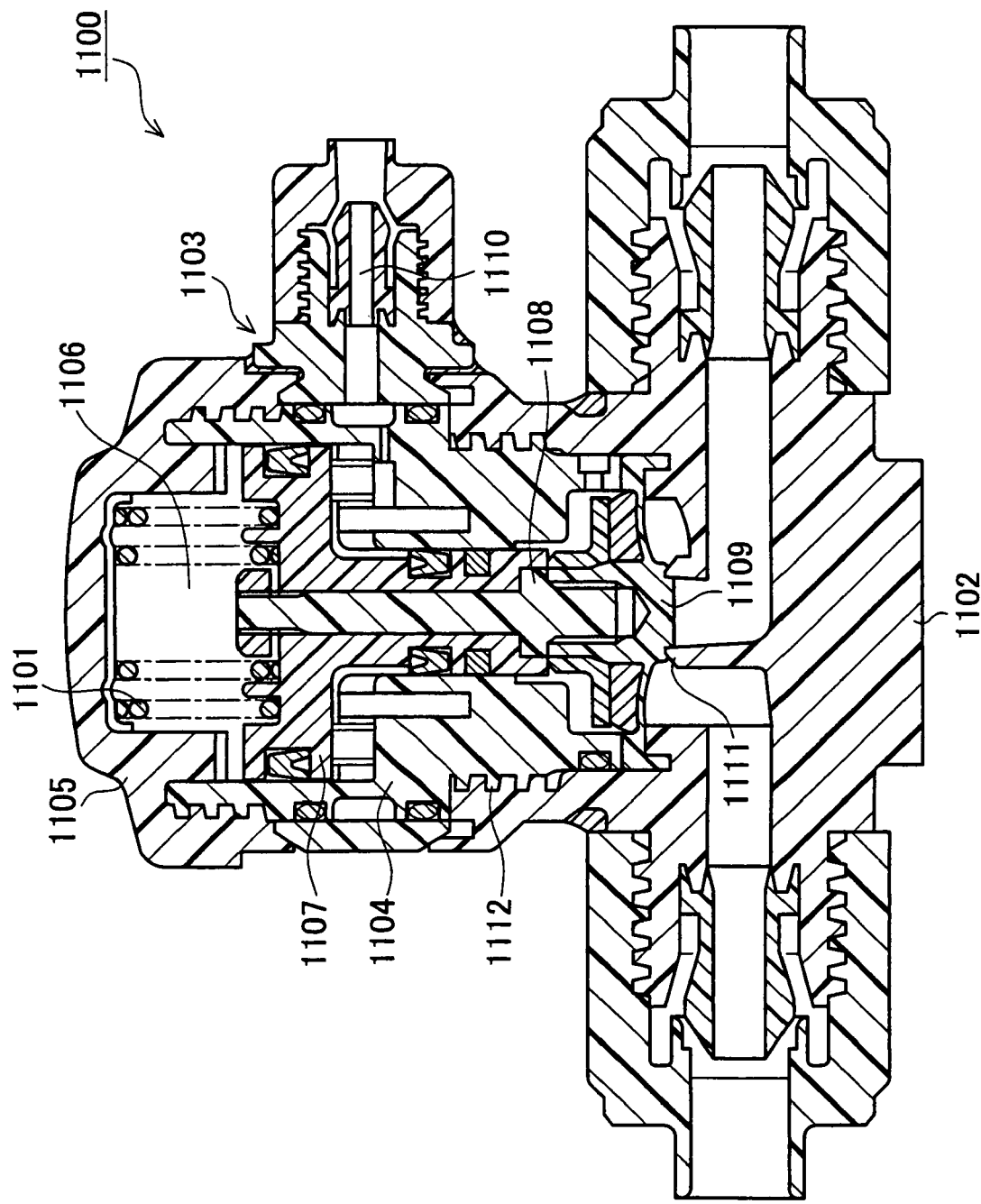
FIG. 16 is a sectional view of a conventional fluid control valve.

Next, a detailed description of a fourth embodiment of the present invention will now be given referring to the accompanying drawings. FIG. 11 is a front view, FIG. 12 is a sectional view, FIG. 13 is a plan view, FIG. 14 is a right-side view of a fluid control valve 100 in the fourth embodiment of the present invention, and FIG. 15 is a sectional view of the fluid control valve taken along a line A-A in FIG. 11. The fluid control valve 100 of the fourth embodiment is basically configured as same as the fluid control valve 61 of the second embodiment shown in FIG. 6 except structure of a manual-operated mechanism 101. Therefore, same configurations as those of the fluid control valve in the second embodiment are designated by the same reference codes and their descriptions are omitted.

As shown in FIG. 14, a second locking member 102 is provided extending downward from a bottom surface of the handle 72. As shown in FIG. 15, the second locking member 102 is formed at both ends with retaining portions 102b radially outwardly elastically deformable. A pair of the retaining portions 102b is deformed outward to hold a holding member 103. These retaining portions 102b exert a predetermined elastic force on the holding member 103 to grasp the cylindrical body 67.

Moreover, the handle 72 is provided with a first locking member 105 extending downward from the bottom surface of the handle 72. When the holding member 103 is mounted on the cylindrical body 67, the first locking member 105 is fit into a recess 103b of the holding member 103 to lock the holding member 103, positioning the holding member 103 in place with respect to the cylindrical body 67. The cylindrical body 67 includes a polygonally shaped part which is fit in the holding member 103. The holding member 103 is provided with a contact surface 103a of a polygonal shape corresponding to the outer shape of the cylindrical body 67 so that the holding member 103 is held against rotation with respect to the cylindrical body 67.

As shown in FIGS. 11, 12, and 14, the holding member 103 is constituted of four divided holding portions 103A, 103B, 103C, and 103D. Each retaining portion 102b of the second locking member 102 has a height corresponding to a distance that covers the holding portions 103B, 103C, and 103D in a vertical direction in the figures. The holding member 103 includes the plate-like divided portions 103A, 103B, 103C, and 103D so as to exhibit a required elastic force (holding force). However, enough strength can not be obtained by only a single plate-like holding portion. Therefore, four plate-like holding portions 103A, 103B, 103C, and 103D are axially spaced and formed integrally with each other through a cylindrical portion to configure the holding member 103, and accordingly the holding member 103 can have enough strength.

In the fluid control valve 100, while the handle 72 is rotated by a predetermined torque, the retaining portions 102b of the second locking member 102 hold each holding portion 103B, 103C, and 103D to press the holding member 103 against an outer peripheral surface of the cylindrical body 67 for preventing deformation of the holding member 103. Therefore, the handle 72 is engaged with the cylindrical body 67 through the holding member 103. In this case, the cylindrical body 67 rotates integrally with the handle 72 to make the diaphragm 22 come into or out of contact with the valve seat 18 by means of the screw motion of the adjustment screw 71.

In the fluid control valve 100, after the diaphragm 22 comes into contact with the valve seat 18 by means of the manual-operated mechanism 101 to fully close the valve or after a locking member 70a of the operation rod 70 is held against the diaphragm retainer 63 to fully open the valve, the handle 72 is further rotated when applied with a torque greater than the predetermined level.

In this case, the retaining portions 102b of the second locking member 102 are deformed radially outwardly to loosen pressing force against the holding member 103. Therefore, the pressing force acting on the holding member 103 to press the holding portions 103A, 103B, 103C, and 103D against the cylindrical body 67 is loosened, so that the holding portions 103A, 103B, 103C, and 103D become elastically deformable outwardly. Consequently, when the handle 72 is turned by the larger torque than the predetermined one, the holding member 103 is elastically deformed and allowed to rotate with respect to the cylindrical body 67, hence rotation of the handle 72 is not transmitted to the cylindrical body 67. As a result, after full opening or full closing of the valve, the valve seat 18 and the diaphragm retainer 63 will not receive unnecessary excessive force and not be deformed or broken accordingly.

In this fluid control valve 100 of the fourth embodiment, the retaining portions 102b grasps the holding portions 103B, 103C, and 103D with the predetermined elastic force, so that it becomes possible to enlarge the torque required for disengaging the cylindrical body 67 from the holding member 103. Further, even if there is a difference in elastic deformation degree between the holding portions 103A, 103B, 103C, and 103D, the elastic force of the retaining portions 102b is capable of adjusting such difference evenly. Therefore, a number of products can have a predetermined equal torque value at which the retaining portions 102b of the second locking member 102 are engaged and disengaged with respect to the cylindrical body 67.

Further, even if it is desired to maintain the torque at a predetermined value by relying only on the elastic deformation of the holding member 103 serving as an engagement member, the torque may not be kept at a stable value due to fatigue deformation or degradation of the holding member 103. On the other hand, even if each holding portion 103A, 103B, 103C, and 103D is deformed or degraded by fatigue or the like, the retaining portions 102b of the second locking member 102 restrain each holding portion 103B, 103C, and 103D from elastically deforming to some extent, so that the predetermined value of the torque can be maintained.

Moreover, since the retaining portions 102b of the second locking member 102 are formed integrally with the handle 72, the advantages mentioned above can be achieved without employing extra components.

The present invention may be embodied in other specific forms without departing from the spirit or essential characteristics thereof.

(1) For instance, in the above mentioned embodiments, the holding member 4, 86 is of a cylindrical shape because the holding member 4, 86 includes the indicator 39 and the manual-operated mechanism 62 which are protruding outwardly from the upper body 3, 64, 84. Alternatively, if components such as the indicator 39 and the manual-operated mechanism 62 protruding form the upper body are not provided, the holding member may be of a cup-like shape having an open end at one side thereof. In this case, the open end of the holding member may be provided with a hooked portion to be hooked on the first catching part of the main body. Further, preferably, an engagement portion to engage the locking member of the main body may be provided on an inner peripheral surface of the holding member.

(2) For instance, in the above mentioned embodiments, the rotation restricting section 55, 91 provided between the holding member 4, 86 and the main body 2, 82 restrains the holding member 4, 86 from rotating. As an alternative, a locking pin or the like may be inserted to the main body through the holding member to restrain the rotation of the holding member for keeping the main body and the upper body screwed together.

(3) In the above mentioned embodiments, the first and second catching parts 45, 46, 87, and 88 are provided protruding outwardly from outer peripheral surfaces of the main body 2, 82 and the upper body 3, 64, 84. Alternatively, the first catching part or the second catching part may be formed as a cutout engageable with the first hooked portion or the second hooked portion.

(4) In the first embodiment, a plurality of the first catching parts 45 and a plurality of the separate pieces 57 are formed in the main body 2 and the holding member 4 respectively at equally spaced intervals so that the holding member 4 can be easily mounted corresponding to a position of the operation port 33. Alternatively, for example, when the operation port 33 is placed at a fixed position, the holding member may be provided with one cutout and a hooked portion is circumferentially formed at an open end except the cutout of the holding member. Then, the hooked portion of the holding member may be hooked on the first catching part which is circumferentially provided in the main body.

Figure 10:
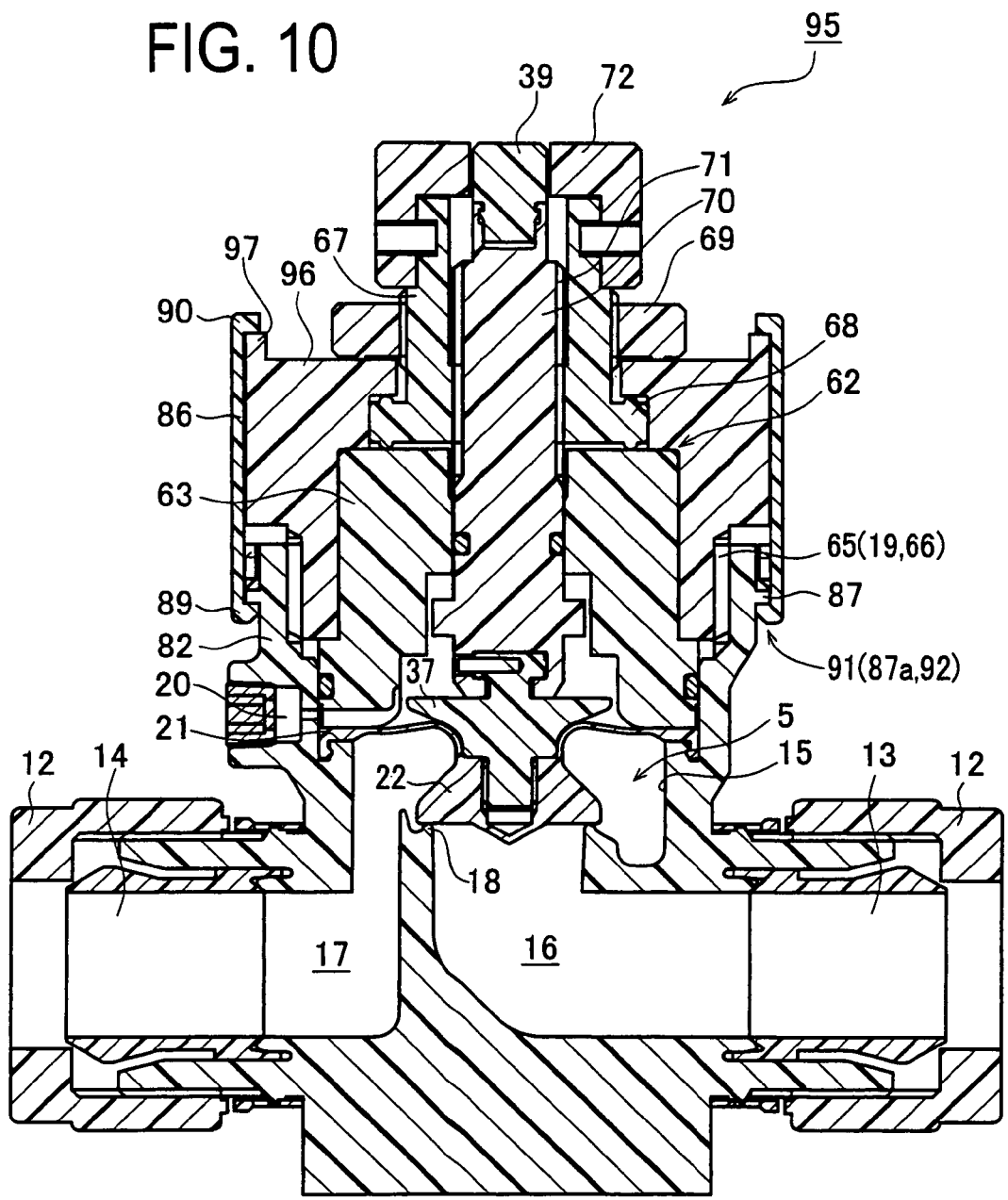
FIG. 10 is a sectional view of a fluid control valve in a modified embodiment.

(5) For instance, the rotation restricting section 91 of the third embodiment may be applied to a fluid control valve 95 including the manual-operated mechanism 62 as shown in FIG. 10. In this case, a second catching part 97 is preferably provided protruding from a top surface of a valve upper body 96.

(6) For instance, in the third embodiment, the engagement portions 92 and the locking member 87a are circumferentially provided at the inner peripheral surface of the holding member 86 and the outer peripheral surface of the main body 82. However, the engagement portions 92 and the locking member 87a may be provided intermittently along a circumferential direction at the inner peripheral surface of the holding member and the outer peripheral surface of the main body.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A fluid control valve comprising;
   a diaphragm;
   a resin valve main body comprising a valve seat with which the diaphragm will come into or out of contact;

a resin valve upper body threadedly engaged with the valve main body; and a holding member engaging with the valve main body and the valve upper body respectively to keep a threaded engagement between the valve main body and the valve upper body, wherein the holding member has a cylindrical shape and is provided with a first hooked portion at a first open end and a second hooked portion at a second open end, the valve main body includes a first catching part hooked on the first hooked portion, the valve upper body includes a second catching part hooked on the second hooked portion, and the second catching part is circumferentially provided along an outer periphery of the valve upper body.

2. The fluid control valve according to claim 1, wherein the valve main body is provided with a locking member at an outer peripheral surface thereof along a circumferential direction of the valve upper body, and the holding member is provided with engagement portions engaged with the locking member.

3. The fluid control valve according to claim 1, wherein the valve upper body includes a manual-operated mechanism to drive the diaphragm through a screw motion.

4. The fluid control valve according to claim 2, wherein the valve upper body includes a manual-operated mechanism to drive the diaphragm through a screw motion.

* * * * *